US011341143B2

(12) United States Patent
Nanavati et al.

(10) Patent No.: US 11,341,143 B2
(45) Date of Patent: May 24, 2022

(54) PROVIDING CONTEXT FACTS

(71) Applicant: Google LLC, Mountain View, CA (US)

(72) Inventors: Akash Nanavati, Mountain View, CA (US); Andrew Huse Helmer, Ann Arbor, MI (US)

(73) Assignee: GOOGLE LLC, Mountain View, CA (US)

( * ) Notice: Subject to any disclaimer, the term of this patent is extended or adjusted under 35 U.S.C. 154(b) by 204 days.

(21) Appl. No.: 16/373,976

(22) Filed: Apr. 3, 2019

(65) Prior Publication Data

US 2019/0228016 A1 Jul. 25, 2019

Related U.S. Application Data

(63) Continuation of application No. 15/265,913, filed on Sep. 15, 2016, now Pat. No. 10,289,625.

(51) Int. Cl.
*G06F 16/2457* (2019.01)
*G06F 16/9535* (2019.01)
*G06F 16/951* (2019.01)

(52) U.S. Cl.
CPC ...... *G06F 16/24578* (2019.01); *G06F 16/951* (2019.01); *G06F 16/9535* (2019.01)

(58) Field of Classification Search
CPC ........... G06F 17/3053; G06F 17/30864; G06F 17/30613

(Continued)

(56) References Cited

U.S. PATENT DOCUMENTS 7,966,291 B1\* 6/2011 Petrovic ................ G06F 16/951
707/641
9,037,580 B2 5/2015 Brown et al.
(Continued)

FOREIGN PATENT DOCUMENTS

CN 102930010 A 2/2013
CN 103064954 A 4/2013
(Continued)

OTHER PUBLICATIONS

EP Office Action in European Appln. 17764488.7-1222, dated Apr. 29, 2019, 3 pages.
(Continued)

*Primary Examiner* — Hung T Vy
(74) *Attorney, Agent, or Firm* — Brake Hughes Bellermann LLP

(57) ABSTRACT

In an aspect, a method includes receiving lists of entities, each list (i) having an associated score, (ii) being associated with a respective context fact, and (iii) ranking a subset of the entities, and for each of the lists of entities, generating, for each entity on the list, a data structure that references (i) the entity, (ii) the context fact associated with the list, (iii) the rank of the entity for the context fact, and (iv) the score for the list. The method can also include receiving data identifying a particular entity, selecting a particular data structure that references the particular entity, and providing, for output, data indicating (i) the context fact associated with the particular data structure that references the particular entity, and (ii) the rank of the entity for the context fact associated with the particular data structure that references the particular entity.

9 Claims, 5 Drawing Sheets

(58) Field of Classification Search
USPC .......................................................... 707/727
See application file for complete search history.

(56) References Cited

U.S. PATENT DOCUMENTS

| | | | |
|---|---|---|---|
| 9,396,235 B1* | 7/2016 | Wald | G06F 16/2453 |
| 9,411,857 B1 | 8/2016 | Chechik et al. | |
| 9,443,021 B2 | 9/2016 | Chandra et al. | |
| 2003/0135488 A1 | 7/2003 | Amir et al. | |
| 2007/0203867 A1* | 8/2007 | Hogue | G06N 5/02 |
| | | | 706/48 |
| 2013/0110825 A1 | 5/2013 | Henry | |
| 2013/0110830 A1 | 5/2013 | Vadlamani | |
| 2014/0046934 A1 | 2/2014 | Zhou et al. | |
| 2015/0073929 A1* | 3/2015 | Psota | G06Q 30/0605 |
| | | | 705/26.2 |
| 2017/0286489 A1* | 10/2017 | Dantressangle | G06F 16/22 |

FOREIGN PATENT DOCUMENTS

| | | |
|---|---|---|
| CN | 104484339 A | 4/2015 |
| WO | 2012075273 A2 | 6/2012 |

OTHER PUBLICATIONS

International Preliminary Report on Patentability issued in International Application No. PCT/US2017/048459, dated Nov. 30, 2018, 13 pages.
International Search Report and Written Opinion issued in International Application No. PCT/US2017/048459, dated Oct. 27, 2017, 15 pages.
Office Action issued in British Application No. GB1714768.7, dated Feb. 8, 2018, 7 pages.
Written Opinion issued in International Application No. PCT/US2017/048459, dated May 8, 2018, 8 pages.
EP Office Action in European Application No. 17764488.7, dated Apr. 29, 2020, 9 pages.
First Office Action with English translation for Chinese Application No. 201710826859.1, dated Feb. 3, 2021, 19 pages.
Summons to Attend Oral Proceedings for European Application No. 17764488.7, dated Mar. 1, 2021, 10 pages.

* cited by examiner

PROVIDING CONTEXT FACTS

CROSS-REFERENCE TO RELATED APPLICATIONS

This application is a continuation application of, and claims priority to, U.S. patent application Ser. No. 15/265,913, titled "PROVIDING CONTEXT FACTS," filed on Sep. 15, 2016. The disclosure of the foregoing application is incorporated herein by reference in its entirety for all purposes.

FIELD

The present specification relates generally to search engines.

BACKGROUND

An internet search engine is typically designed to search for information on the World Wide Web. Users can submit queries to the search engine and the search engine can identify and present a list of documents including relevant information in response to each search query. Specifically, the relevant information can include a fact that is relevant to the query.

SUMMARY

In some implementations, a fact can be provided in response to a query. The fact can be helpful in providing information pertaining to the query, however, placing the fact within a context of other similar facts may be more helpful. In certain aspects, contextual information regarding a particular fact can include ranking the fact among the other similar facts. For example, it may be helpful to know that Barack Obama is six feet and one inch tall, however, it may be more helpful to know that Barack Obama is the ninth tallest United States President. As such, the height of Barack Obama can be provided in addition to the context of how the height of Barack Obama compares to other United States Presidents.

One innovative aspect of the subject matter described in this specification is embodied in methods that include the actions of receiving one or more lists of entities, each list (i) having an associated score, (ii) being associated with a respective context fact, and (iii) ranking a subset of the entities, each entity of the subset being ranked based on a respective value associated with the entity for the respective context fact, and for each of the lists of entities, generating, for each entity on the list, a data structure that references (i) the entity, (ii) the context fact associated with the list, (iii) the rank of the entity for the context fact, and (iv) the score for the list. The method can also include receiving data identifying a particular entity, selecting a particular data structure that references the particular entity, and providing, for output, data indicating (i) the context fact associated with the particular data structure that references the particular entity, and (ii) the rank of the entity for the context fact associated with the particular data structure that references the particular entity.

Other implementations of this and other aspects include corresponding systems, apparatus, and computer programs, configured to perform the actions of the methods, encoded on computer storage devices.

Implementations may each optionally include one or more of the following features. For instance, the method can include the score for each list based on a frequency of recent search queries including the list. The method can also include the particular data structure being selected based on the score of the list that references the particular entity. The method can further include providing, for output, data indicating (i) the subset of the entities, each entity of the subset of entities being referenced by the particular data structure, and (ii) the ranking for each entity of the subset of the entities. In certain aspects, the method can include providing a comparison between the data indicating the ranking for each entity of the subset of entities and a ranking threshold, selecting one or more entities of the subset of the entities based on the comparison, and providing, for output, data indicating (i) the one or more selected entities and (ii) the ranking for each entity of the selected entities. The method can include generating natural language text corresponding to the data indicating (i) the context fact associated with the particular data structure that references the particular entity, and (ii) the rank of the entity for the context fact associated with the particular data structure that references the particular entity, and providing, for output, the natural language text. Further, the method can include receiving data identifying a particular entity including receiving a synonym that corresponds to the particular entity.

Advantageous implementations can include one or more of the following features. The method for providing context facts includes providing a structured fact along with greater contextual information. The greater contextual information can indicate how the structured fact ranks within a broader group. The contextual information can use informative text that indicates the ranking of the structural fact within a particular attribute or property. In addition to providing the ranking of structured fact, the method can provide other related entities that are ranked among the broader group. The related entities can be provided alongside the structured fact, to distinguish the prominence of the structured fact by presenting it in a broad context.

In certain aspects, the method for providing context facts can select relevant context facts based on identifying a particular entity from received data. As such, the method can include selecting an appropriate context for a particular entity when one or more contexts are associated with the particular entity. The method for providing context facts can also include synthesizing natural language transcriptions that correspond to the context facts of the particular entity. The natural language transcriptions can be provided for textual output, audial output, or both. In some aspects, the natural language transcriptions can be provided as audial output via text-to-speech (TTS) or other voice-response.

The method for providing context facts can be applied to various entities, in which the various entities can be sorted into categories or groups based on common features. Thus, the method for providing context facts can automatically associate context facts with each of the entities based on related entities within the automatically generated lists.

In some aspects, the method for providing context facts can automatically select context facts based on a frequency of appearance of the entities in search queries. As such, the method can identify context facts for each entity based on the relevance of each entity and each entity's corresponding fact in recent search queries. The method can also identify context facts for each entity based on a frequency of recent search queries including a list that corresponds to the particular entity.

The method for providing context facts includes a lesser computational complexity than that of exhaustively searching a knowledge base of information associated with query searches. As such, the method can be used to provide context facts without crawling the entire knowledge base of information. Instead, the method can filter out "unpopular" data that does not occur frequently in recent search queries to determine context facts efficiently and accurately.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
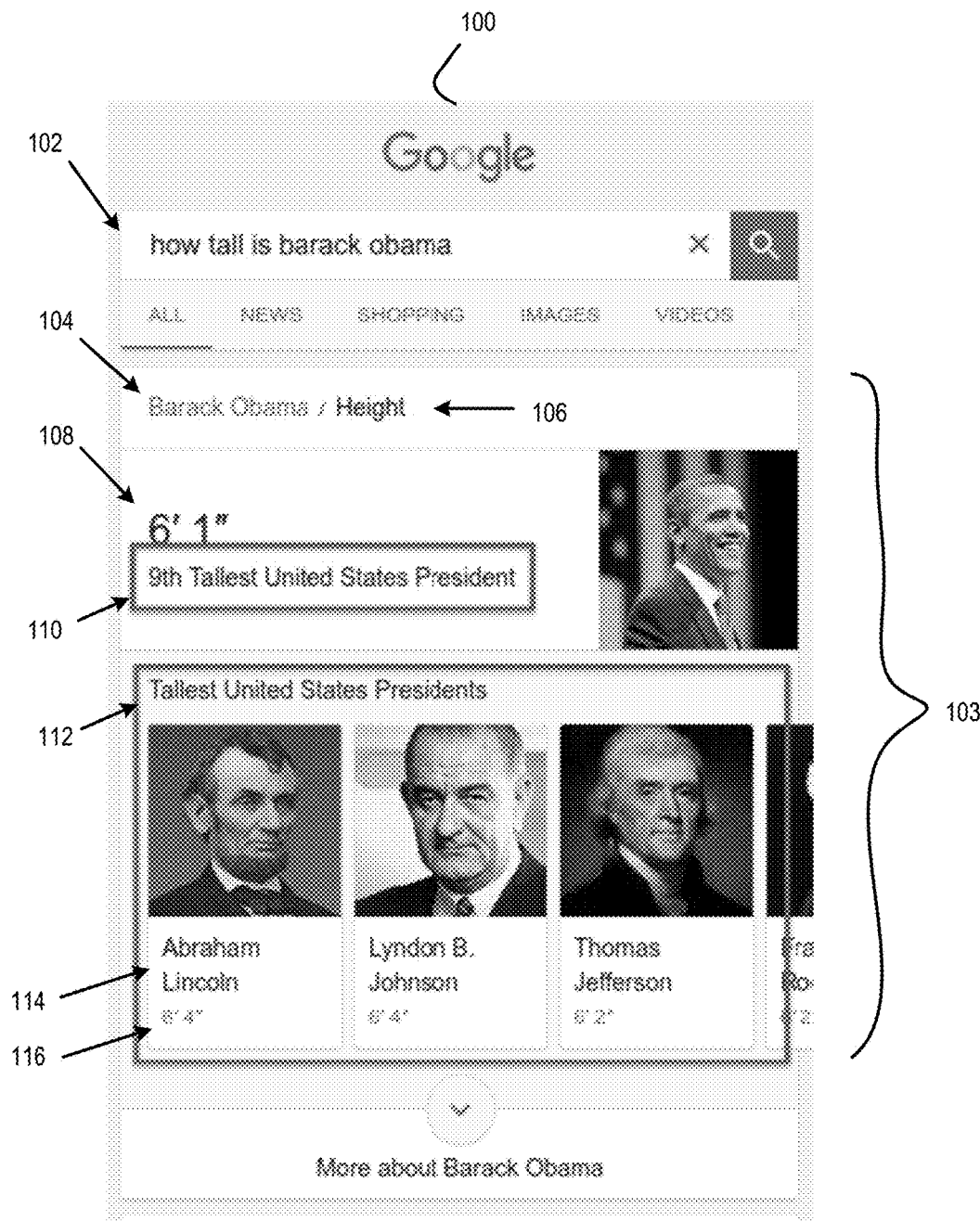
FIG. 1 illustrates an example of a browser interface for displaying context facts, according to certain aspects of the disclosure.

FIG. 1 illustrates an example of a browser interface 100 for displaying context facts, according to certain aspects of the disclosure. The browser interface 100 for displaying context facts includes a query field 102 for displaying entered queries and a knowledge panel 103 for displaying data corresponding to the entered queries. In certain aspects, the knowledge panel 103 can include an entity region 104 for displaying an entity associated with the query, an attribute region 106 for displaying an attribute associated with the entity, a fact region 108 for displaying a fact associated with the entity and attribute, a context fact region 110 for displaying a context fact associated with the entity, e.g., a rank of the entity among other entities on the basis of the fact, a list region 112 for displaying a list that is based on the attribute 106 associated with the entity, a related entity region 114 for displaying related entities that are associated with a list of the entity, and a related fact region 116 for displaying related facts associated with the fact of the entity.

The browser interface 100 for displaying context facts can be provided for output by a server and displayed at a computing device. The computing device can include one or more computing devices such as a smartphone, a laptop computer, a desktop or personal computer, a tablet, and the like.

A server can be configured to receive data identifying a particular entity that is based on contents of a query field 102. The server can be configured to provide data that corresponds to the entity of the entity region 104 for output. In certain aspects, the data is output at the knowledge panel 103 of the browser interface 100 for providing context facts.

The browser interface 100 can be used to provide contextual information in response to queries of the query field 102. The query field 102 can include an entity, a synonym of an entity, one or more terms, a phrase, an explicit question, an implicit question, or any combination thereof.

The entity of the entity region 104 can correspond to a particular attribute or property that is displayed in the attribute region 106.

For example, the query field 102 can include "how tall is barack obama." As such, the respective entity region 104 may include "Barack Obama" and the respective attribute region may include "Height" 106. In this instance, the fact region 108 corresponding to the entity and the attribute would be "6' 1" (six foot and one inch). As such, the server can be configured to provide data for output that indicates a fact corresponding to the entity of the query field 102. The server can also be configured to provide data for output that indicates one or more context facts displayed at the context fact region 110. In some aspects, the context facts can describe a prominence of the fact 108 among a list of related facts.

In certain aspects of the present disclosure, the browser interface 100 for displaying context facts can be used to provide additional contextual information in response to the server receiving data identifying a particular entity 104. The browser interface 100 for displaying context facts can include additional information corresponding to a context fact. In some aspects, the additional information can include a list region 112 for displaying an indicator of a list associated with the entity. The additional information can further include a related entity region 114 for displaying one or more related entities that are associated with the list of the entity 114. For example, if a query field 102 includes "how tall is Barack Obama," the context fact region 110 can include "9th Tallest United States President." In this instance, the corresponding list of related entities associated with the context fact would be "Tallest United States Presidents."

Each of the related entities can include a related fact. The list corresponding to the context fact can be provided along with the related entities and the related facts corresponding to each of the related entities of the respective list. In some aspects, a predetermined number of related entities may be provided at the related entity region 114 of the browser interface 100 for displaying context facts. The number of related entities that are provided can be based on the list associated with the context fact, the context fact, the total number of related entities, or any combination thereof. For example, if the list region 112 of the context fact includes "Tallest United States Presidents," the related entity region 114 can include the four tallest United States Presidents: Abraham Lincoln, Lyndon B. Johnson, Thomas Jefferson, and Franklin D. Roosevelt and the respective related fact, or height in this instance, for each.

Figure 2:
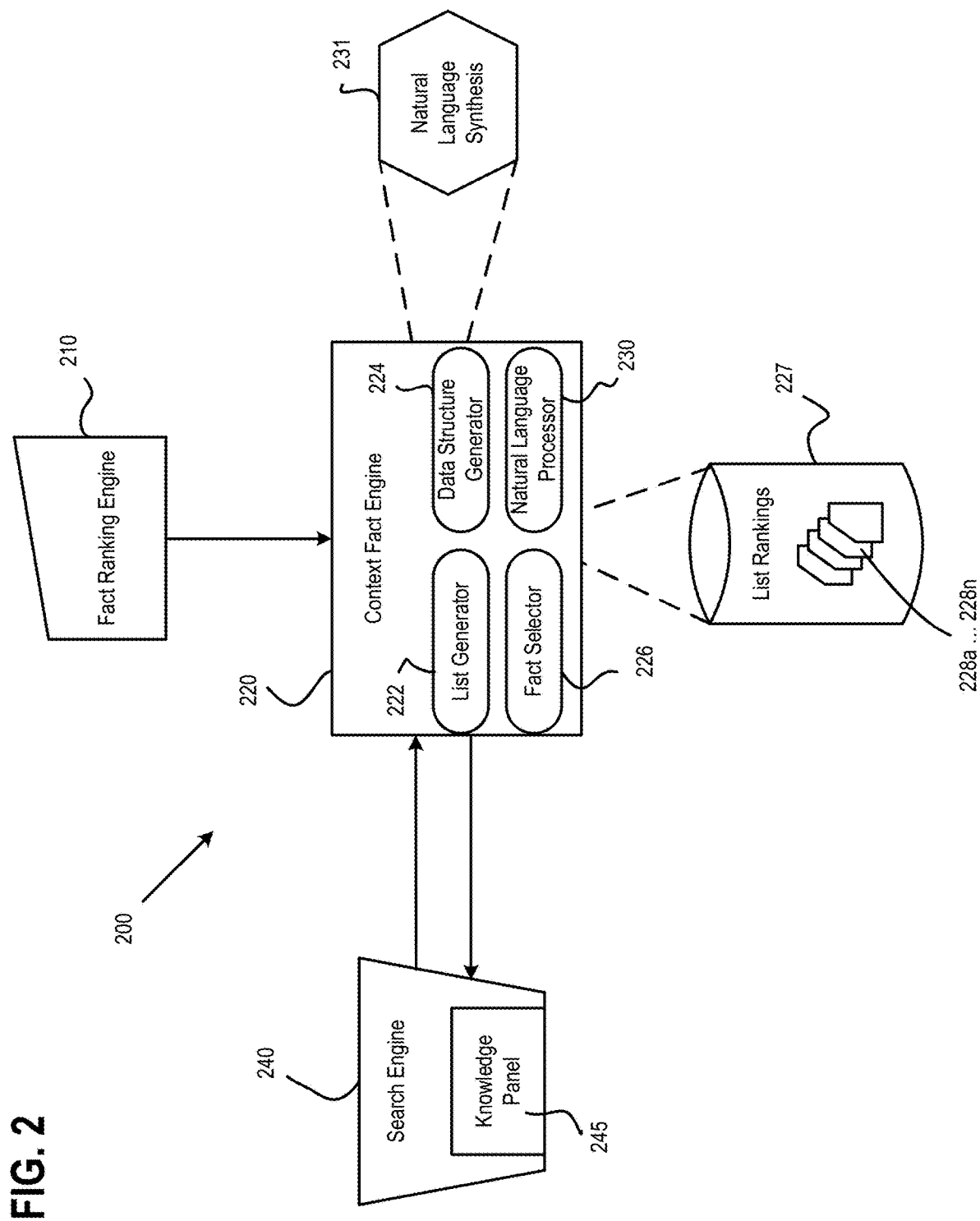
FIG. 2 is an illustration of an exemplary system for providing context facts, according to certain aspects of the disclosure.

FIG. 2 is an illustration of an exemplary system for providing context facts 200, according to certain aspects of the disclosure. The system for providing context facts 200 can include a fact ranking engine 210 for ranking facts, a context fact engine 220 for associating context facts with a particular fact, and a search engine 240 for receiving queries and providing data for output.

The fact ranking engine 210 can rank two or more facts based on a particular attribute. For example, the fact ranking engine 210 can rank the tallest United States Presidents. In this instance, the fact ranking engine 210 can rank entities such as United States Presidents based on a fact corresponding to each president such as their heights. As such, the fact ranking engine 210 can determine that the tallest four United States Presidents in descending order of height are: Abraham Lincoln, Lyndon B. Johnson, Thomas Jefferson, and Franklin D. Roosevelt. The fact ranking engine 210 can associate a rank with each of the facts. In this instance, Abraham Lincoln can be ranked first, Lyndon B. Johnson can be ranked second, Thomas Jefferson can be ranked third, and Franklin D. Roosevelt can be ranked fourth.

In certain aspects, a particular fact may be ranked in one or more different categories. For example, the fact ranking engine 210 can rank K2 Mountain according to a first attribute such as tallest Mountains in the World, and the fact ranking engine 210 can also rank K2 Mountain according to a second attribute such as tallest Mountains in Asia. As such, the fact ranking engine 210 can associate K2 Mountain with a first rank for the first attribute of tallest Mountains in the World, and the fact ranking engine 210 can associate K2 Mountain with a second rank for the second attribute of tallest Mountains in Asia.

The context fact engine 220 can determine context facts that are associated with a particular fact. The context fact engine 220 can include a list generator 222 for generating lists of facts, a data structure generator 224 for generating data structures that reference data corresponding to a particular fact, a fact selector 226 for selecting a particular fact among the generated lists, and a natural language processor 230 for processing natural language data corresponding to a particular fact and context data associated with the particular fact.

The list generator 222 of the context fact engine 220 can be used to generate lists that each correspond to a particular attribute. The lists can include one or more facts that correspond to the particular attribute. For example, the list generator 222 can generate a list of the tallest United States Presidents. In this instance, the attribute of this list can be height. The list can include one or more entities such as United States Presidents in which each president is associated with a respective fact such as the president's height. The list can include ranks for each of the facts. In certain aspects, the fact ranking engine 210 provides the ranks for each of the facts to the context fact engine 220.

The list generator 222 can further be used to associate scores with each of the lists. The scored lists can be used by the context fact engine 220 for list rankings 227. In certain aspects, each list can be associated with a score 228a-228n. The scores of the lists 228a-228n may indicate a popularity of the list. In some aspects, the score of a particular list can be determined by a frequency of recent queries that include entities associated with the particular list. In certain aspects, the score of the particular list can be based on a frequency of recent search queries including the particular list. For example, a list of the tallest Mountains in the World can include a greater score in comparison to a list of the tallest Mountain in Asia. As such, the list of the tallest United States Presidents may be more popular than the list of the oldest United States Presidents. Thus, lists that appear frequently in recent queries may be associated with a greater score than lists that appear infrequently in recent queries.

The data structure generator 224 can be used to generate a data structure for each entity of the lists. A data structure can be created for each of the entities within a particular list. The data structure can include a particular entity, a fact associated with the particular entity, and the score of the list associated with each of the facts associated with the particular entity. The data structure can also include a rank for the fact associated with the particular entity. For example, Abraham Lincoln can include a rank for the tallest United States Presidents list. As such, Abraham Lincoln can be ranked as the tallest United States President.

The fact selector 226 of the context fact engine 220 can be used to select a particular data structure that is associated with an entity. In some aspects, the fact selector 226 can use data of the search engine 240 that corresponds to a particular entity, and select a particular data structure based on the entity associated with the search engine data. In certain aspects, the particular data structure can be based on the particular entity as well as an attribute of the particular entity. The search engine data can include data from query field such as query terms. The search engine 240 and the data provided by the search engine 240 will be discussed further herein.

The natural language processor 230 of the context fact engine 220 can be used to perform natural language synthesis 231 on data of a selected data structure. The natural language processor 230 can synthesize natural language text to represent data of the selected data structure. In an example, a data structure associated with the entity Barack Obama can be chosen regarding search engine 240 data corresponding to tallest United States Presidents. In this instance, Barack Obama can be ranked as ninth among this particular list. As such, the natural language processor 230 can be used to synthesize text such as "Barack Obama is the ninth tallest United States President." For example, a user may enter a query via a phone, watch, countertop device, and the like. The natural language processor 230 can be configured to format data of the selected data structure as audial output and provide the audial output for output via TTS or other voice-response.

In certain aspects, the context fact engine 220 can be in communication with a search engine 240. The search engine 240 can be used to provide data to the context fact engine 220. The context fact engine 220 can be used to determine an entity and an attribute of the search query data. The search query data of the search engine 240 can be used by the fact selector 226 of the context fact engine 224 to determine a particular data structure corresponding to the entity and the attribute of the search engine data.

The search engine 240 can also be used to receive data that is provided for output by the context fact engine 220. In certain aspects, the data can be displayed at a knowledge panel 245 of the search engine. The context fact engine 220 can provide data for output corresponding to the particular fact and the particular entity. In some aspects, the context fact engine 220 can provide data for output such as a rank associated with the particular fact of the particular entity. The data for output can further include context data that is associated with the particular fact of the particular data. For example, if the rank of Barack Obama among a list of the tallest United States Presidents is provided for output, the rank of the top four tallest United States Presidents can also be provided for output as context data at the search engine 240.

Figure 3:
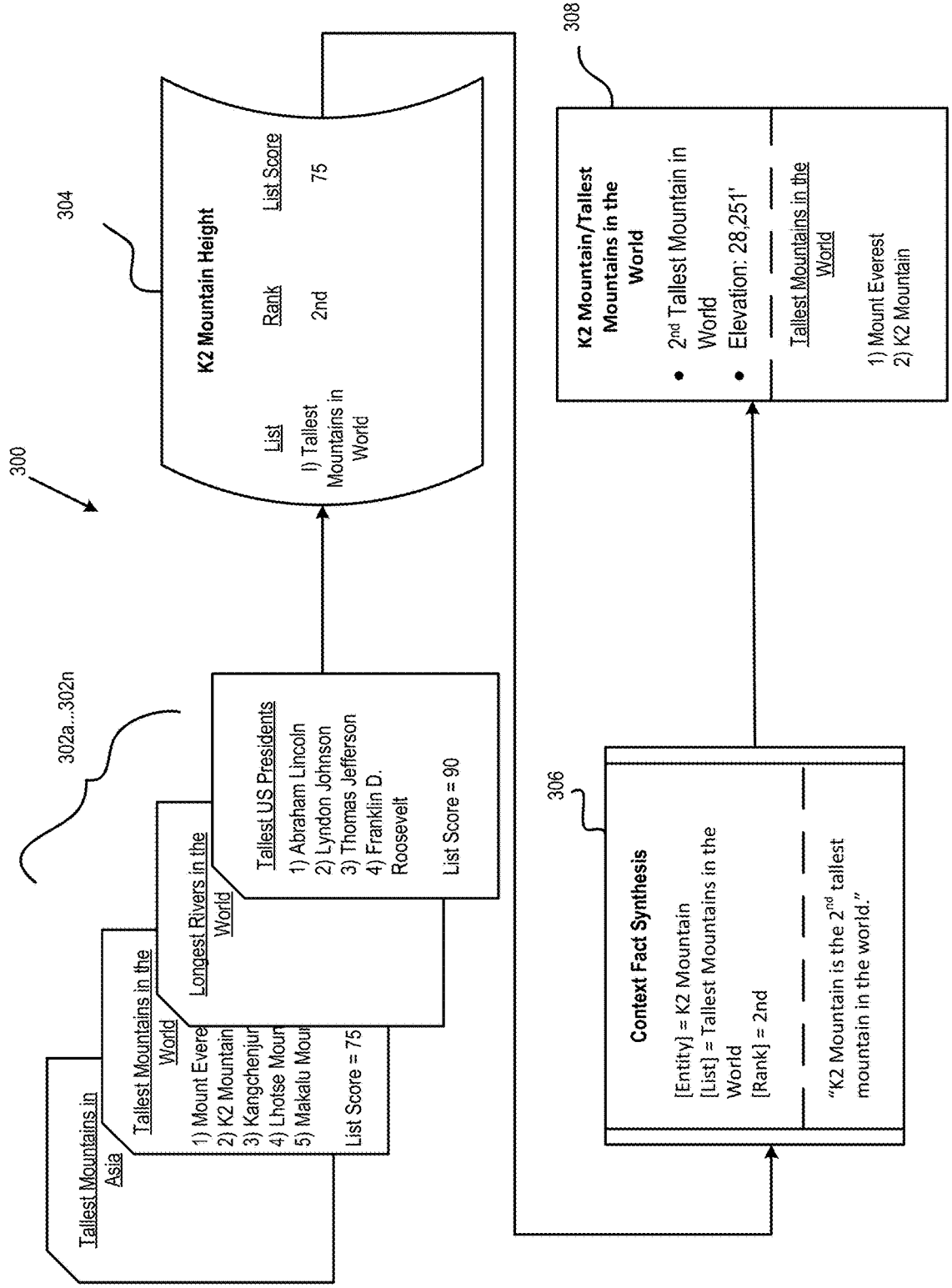
FIG. 3 is a workflow for providing context facts, according to certain exemplary aspects of the disclosure.

FIG. 3 is a workflow for providing context facts 300, according to certain exemplary aspects of the disclosure. The workflow for providing context facts 300 describes a process of receiving data identifying a particular entity, selecting a generated data structure based on the particular entity, and providing data of the data structure for output. The workflow for providing context facts 300 can include lists of ranked facts 302a-302n, a data structure 304 that corresponds to a particular entity, context fact synthesis 306 which selects a particular data structure and list of the data structure to synthesize, and a context fact output 308 that provides data of the context fact synthesis 306 for output. In certain aspects, the data structure 304 can correspond to a particular entity, a particular attribute of the entity, or both.

The lists of ranked facts 302a-302n can each include one or more entities that are ranked based on facts associated with each entity. For example, the lists of ranked facts 302a-302n can include the Tallest Mountains in Asia, the Tallest Mountains in the World, the Longest Rivers in the World, the Tallest United States Presidents, and the like. In the list of Tallest Mountains in the World, entities such as mountains may be ranked according to an attribute such as height. In certain aspects, a predetermined number of entities may be contained in each of the lists of ranked facts 302a-302n. As such, the list of Tallest Mountains in the World can include a total of five entities: Mount Everest, K2 Mountain, Kangchenjunga, Lhotse Mountain, and Makalu Mountain. The list of tallest mountains in the world may rank the mountains based on the height of each mountain. Referring to FIG. 3, Mount Everest can be ranked first, K2 Mountain can be ranked second, Kangchenjunga can be ranked third, Lhotse Mountain can be ranked fourth, and Makalu Mountain can be ranked fifth.

The lists of ranked facts 302a-302n can each be associated with a score. The score of each list may correspond to a relative popularity of each list. In certain aspects, the score of each list is generated based on a frequency of recent search queries including an entity that is associated with the particular list. In some aspects, the score of the particular list can be based on a frequency of recent search queries including the particular list. For example, a list of Tallest United States Presidents may appear more frequently in recent search queries than a list of Tallest Mountains in the World. In this instance, the list of Tallest United States Presidents may be determined to be more popular than the list of Tallest Mountains in the World. As such, the list of Tallest Mountains in the World can include a list score of 75 out of 100 and the list of Tallest United States Presidents can include a list score of 90 out of 100 to reflect the occurrence of each list in recent search queries.

A data structure 304 can be generated for each fact of the entities associated with the lists of ranked facts 302a-302n. The data structure 304 can correspond to a particular attribute of a respective entity. In some aspects, the data structure 304 can reference a list associated with a particular entity, a rank of the entity within the list, and a list score corresponding to the list associated with each respective attribute of the entity. For example, K2 Mountain Height can be associated with a data structure as it is located within the lists of ranked facts 302a-302n. Referring to FIG. 3, the K2 Mountain Height can be associated with the list of Tallest Mountains in the World. There can be a rank for the entity and a list score in each data structure. As such, K2 Mountain Height can be ranked second in the list of Tallest Mountains in the World and include a list score of 75.

The context fact synthesis 306 can be used to select a particular data structure 304. In certain aspects, the context fact synthesis 306 uses the list scores of each data structure 304 to determine which data structure to select. For example, if there are two K2 Mountain Height data structures and each of the data structures is associated with a different list, the two lists may each include two different list scores. As such, the context fact synthesis 306 can select the K2 Mountain Height data structure with the greatest score for synthesis. For example, a first K2 Mountain Height data structure can be associated with a list of Tallest Mountains in the World including a list score of 75, and a second K2 Mountain Height data structure can correspond to a list of Tallest Mountains in Asia with a score of 15. As such, the context fact synthesis 306 can select the K2 Mountain Height data structure that references the list of Tallest Mountains in the World for synthesis, due to the greater score of this list between the two lists.

The context fact synthesis 306 can also be used to perform natural language synthesis on the entity and the fact corresponding to the entity. As such, the entity and the corresponding fact can be provided for output in the form of text, audio, or both. For example, if the entity is determined to be K2 Mountain, the list is determined to be Tallest Mountains in the World, and the rank of the entity within the list is determined to be second, the context fact synthesis 306 can synthesize plain English text to be provided for output such as "K2 Mountain is the 2nd tallest mountain in the world."

The context fact output 308 can include the output that has been synthesized and provided by the context fact synthesis 306. The context fact output 308 can output data provided by the context fact synthesis 306 via text, audio, or both. The context fact output 308 can include the entity, the particular list associated with the entity, the rank of the entity within the list, and the fact of the entity. For example, the entity can include K2 Mountain, the list associated with K2 Mountain can be Tallest Mountains in the World, the rank of the entity within the list can be second tallest mountain in the world, and the fact can correspond to the height of K2 Mountain.

In certain aspects, the context fact output 308 can provide additional information pertaining to the prominence of the fact of the entity within the list. The context fact output 308 can include related entities that are included in the list of the selected entity. For example, if the rank of K2 Mountain among the list of Tallest Mountains in the World is output, the context fact output 308 can also output other mountains within the list of Tallest Mountains in the World. Thus, the rank of K2 Mountain may be provided among other mountains ranked in the list of Tallest Mountains in the World. In this instance, K2 Mountain can be compared to the other ranked mountains. In some aspects, the facts of each related entity is output in addition to each related entity's rank. For example, the height of each mountain in the list of Tallest Mountains in the World can be output in addition to the rank associated with of the mountains.

Figure 4:
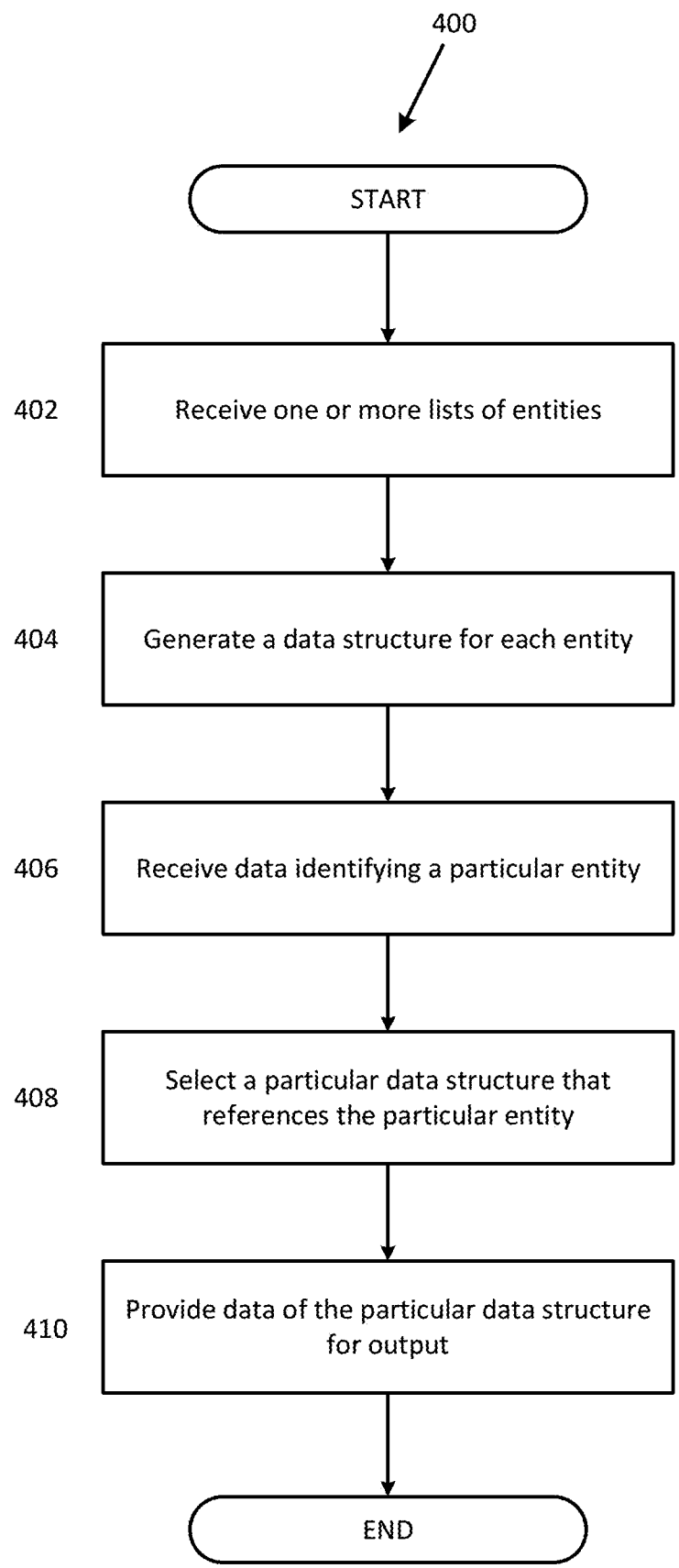
FIG. 4 illustrates an exemplary flowchart for providing context facts, according to certain aspects of the disclosure.

FIG. 4 illustrates an exemplary flowchart for providing context facts 400, according to certain aspects of the disclosure. The flowchart for providing context facts 400 describes a process of providing context facts in response to query terms of a search engine. At step, 402 a server can be configured to receive one or more lists of entities. Each of the lists can include an associated score, be associated with a respective fact, and include a ranking of a subset of the entities.

The score associated with a particular list can indicate a relative popularity of the list. In certain aspects, the score of the particular list is determined based on a frequency of occurrence of the entities associated with the list in recent search queries. In some aspects, the score of the particular list can be based on a frequency of recent search queries including the particular list. For example, a list of Tallest United States Presidents may appear more frequently in recent search queries than a Tallest Mountains in the World list. In this instance, the list of Tallest United States Presidents may be determined to be more popular than the list of Tallest Mountains in the World. As such, the list of Tallest Mountains in the World can include a list score of 75 out of 100 and the list of Tallest United States Presidents can include a list score of 90 out of 100 to reflect the occurrence of each list in recent search queries.

The respective fact of each list can include an attribute or property that applies to all of the entities of the list. For example, an attribute can include mountain height, United States President height, river length, and the like. In some aspects, the respective fact of each list can be used to classify the lists.

The ranking of the subset of entities can be based on a respective value associated with each entity. The respective value can correspond to a value of each entity with respect to the respective fact of each list. For example, a respective value for K2 Mountain can be the height or elevation of K2 Mountain. The elevation of K2 Mountain can be used to determine that K2 Mountain is the second tallest mountain in a list of tallest mountains such as a list of the tallest mountains in the world.

At step 404, the server can be configured to generate a data structure for each entity of the lists. In some aspects, the data structure can reference a particular entity, a fact of the entity, a rank of the entity that is associated with the fact, and a score of the list associated with the particular fact of the entity. The data structure can be generated for each of the entities associated with the received lists. The data structure can correspond to a particular fact of a respective entity. For example, K2 Mountain Height can be associated with one or more data structures. A K2 Mountain Height data structure can be associated with a list of tallest mountains in the world. The data structure can further include a rank for the entity among the list and a score associated with the list of tallest mountains in the world. In an example, a particular data structure can include K2 Mountain being ranked second in the list of tallest mountains in the world, in which the list of tallest mountains is associated with a list score of 75.

At step 406, the server can be configured to receive data identifying a particular entity. In some aspects, the server can receive data via a search engine. The server can receive data corresponding to search query terms of a search engine. The server can further be configured to identify a particular entity based on the data received. For example, the server can receive a search query of "how tall is K2 Mountain" and identify that K2 Mountain can be a particular entity of that search query. In certain aspects, the server can be configured to identify a particular entity based on a synonym of the entity. For example, the server can reach a search query of "how tall is Mount Godwin-Austen." In this instance, the server can be configured to identify that the entity of the search query may be K2 Mountain.

At step 408, the server can be configured to select a particular data structure that references the identified entity. The particular data structure can be based on terms of a search query. In some aspects, the particular data structure can be selected based on a score of a list associated with the particular data structure. For example, if there are two K2 Mountain Height data structures, and each of the K2 Mountain Height data structures are associated with a different list, the two lists may each include a different list score. As such, the server can select the K2 Mountain Height data structure with the greatest score. For example, a first K2 Mountain Height data structure can be associated with a list of Tallest Mountains in the World including a list score of 75, and a second K2 Mountain Height data structure can correspond to a list of Tallest Mountains in Asia with a score of 15. In this instance, the server can be configured to select the first K2 Mountain Height data structure associated with the list of Tallest Mountains in the World because of the greater corresponding list score.

At step 410, the server can be configured to provide data of the selected data structure for output. The provided data can include the fact associated with the selected data structure that references the particular entity as well as the rank of the entity for the fact. In certain aspects, the data can be provided by the server to be displayed at a knowledge panel of a search engine. In some aspects, the knowledge panel can be displayed at a user interface of a computing device such as a smartphone, a laptop computer, a desktop or personal computer, a tablet, and the like.

The server can be configured to provide data for output corresponding to the particular fact and the particular entity. In some aspects, the data for output can include a rank associated with the particular fact of the particular entity. The data for output can further include context data that is associated with the particular fact of the particular data. The context data can include a subset of entities that are associated with the list of the selected data structure. The context data can also include rankings of the subset of entities within the list of the selected data structure. For example, if the rank of K2 Mountain among a list of the tallest mountains in the world is provided for output, a predetermined number of the tallest mountains in the world other than K2 Mountain and their corresponding rankings can be provided for output as context data.

In some aspects, the server can be configured to provide a comparison between the data indicating the ranking for each entity within the subset of entities and a ranking threshold. The server can select one or more entities of the subset of entities based on the comparison, and provide data corresponding to the selected entities of the subset for output. Thus, the ranking threshold can be used as a cutoff so that only a certain number of entities can be provided for output in addition to the data of the selected data structure.

In certain aspects, the server can be configured to generate natural language transcriptions corresponding to the data provided for output. In this instance, the server can be configured to provide natural language text or audio for output that is based on the natural language transcriptions. As such, the entity and the corresponding fact can be provided for output in the form of text, audio, or both. In certain aspects, a user may enter a query via a phone, watch, countertop device, and the like. The server can be configured to format output data relative to the query as audial output and provide the audial output for output via TTS or other voice-response. For example, if the entity is determined to be K2 Mountain, the list is determined to be Tallest Mountains in the World, and the rank of the entity within the list is determined to be second, the server can be configured to synthesize plain English text to be provided for output such as "K2 Mountain is the 2nd tallest mountain in the world."

Figure 5:
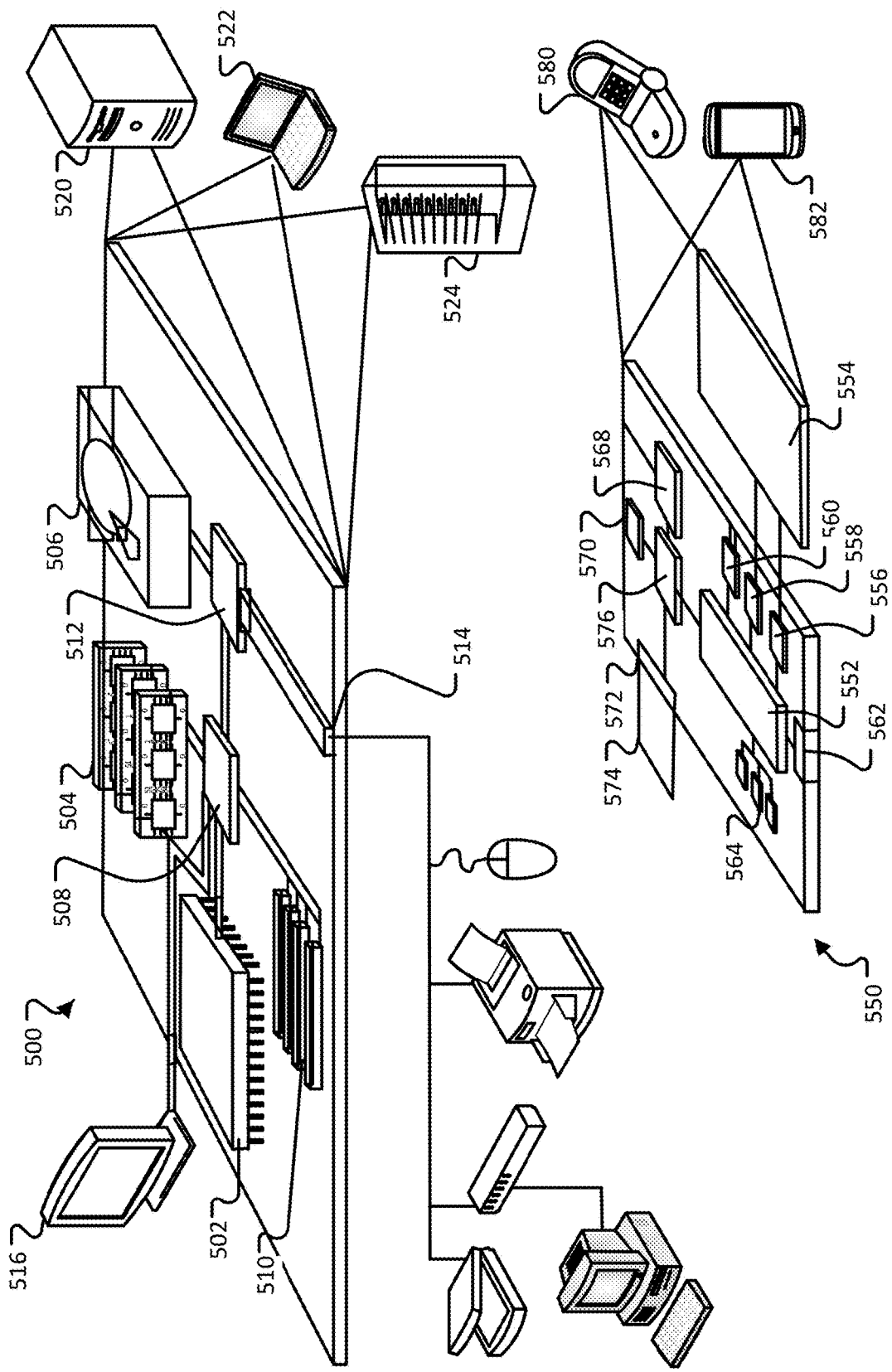
FIG. 5 is a computer device and a mobile computer, according to certain exemplary aspects of the disclosure.

FIG. 5 is a computer device 500 and a mobile computer 550, according to certain exemplary aspects of the disclosure. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 400. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 504, the storage device 506, or a memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 may execute instructions within the computing device 540, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 548 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 may be implemented as one or more of a computer-readable medium or media, a volatile memory unit or units, or a non-volatile memory unit or units. Expansion memory 554 may also be provided and connected to device 550 through expansion interface 552, which may include, for example, a SIMM (Single In Line Memory Module) card interface. Such expansion memory 554 may provide extra storage space for device 550, or may also store applications or other information for device 550. Specifically, expansion memory 554 may include instructions to carry out or supplement the processes described above, and may include secure information also. Thus, for example, expansion memory 554 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 554, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 550 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A computer-implemented method comprising:
    receiving, at a user device in response to a query sent to a search system by the user device, data describing:
        a list of entities determined to be responsive to the query,
        a context fact for the list of entities, the context fact being a first attribute shared by each entity in the list of entities and the context fact including additional information corresponding to the query and a value that provides a basis for a comparison between each entity in the list of entities, and
        a ranking of the entities in the list of entities relative to each other entity in the list of entities based on a respective value of the context fact for the entity;
    displaying in a first region on a display of the user device:
        data describing a particular entity from the list of entities responsive to the query, and
        data describing a second attribute associated with the particular entity responsive to the query; and
    displaying in a second region that is separate from the first region on the display of the user device:
        data describing two or more other entities from the list of entities, and
        data describing third attributes associated with the two or more other entities responsive to the query,
        wherein the two or more other entities are arranged in relative order to each other based on a rank of the two or more other entities, the rank based on the context fact and respective values of the context fact for the two or more other entities.

2. The computer-implemented method of claim 1, wherein the context fact is selected by the search system based on a frequency of recent search queries.

3. The computer-implemented method of claim 1, wherein the context fact is selected by the search system based on one or more terms in the query.

4. A system comprising a user device and one or more storage devices storing instructions that are operable, when executed by the user device, to cause the user device to perform operations comprising:
    receiving, at the user device in response to a query sent to a search system by the user device, data describing:
        a list of entities determined to be responsive to the query,
        a context fact for the list of entities, the context fact being a first attribute shared by each entity in the list of entities and the context fact including additional information corresponding to the query and a value that provides a basis for a comparison between each entity in the list of entities, and
        a ranking of the entities in the list of entities relative to each other entity in the list of entities based on a respective value of the context fact for the entity;
    displaying in a first region on a display of the user device:
        data describing a particular entity from the list of entities responsive to the query, and
        data describing a second attribute associated with the particular entity responsive to the query; and
    displaying in a second region that is separate from the first region on the display of the user device:
        data describing two or more other entities from the list of entities, and
        data describing third attributes associated with the two or more other entities responsive to the query,
        wherein the two or more other entities are arranged in relative order to each other based on a rank of the two or more other entities, the rank based on the context fact and respective values of the context fact for the two or more other entities.

5. The system of claim 4, wherein the context fact is selected by the search system based on a frequency of recent search queries.

6. The system of claim 4, wherein the context fact is selected by the search system based on one or more terms in the query.

7. A non-transitory computer storage medium storing instructions executable by a user device and that upon such execution cause the user device to perform operations comprising:
    receiving, at the user device in response to a query sent to a search system by the user device, data describing:
        a list of entities determined to be responsive to the query,
        a context fact for the list of entities, the context fact being a first attribute shared by each entity in the list of entities and the context fact including additional information corresponding to the query and a value that provides a basis for a comparison between each entity in the list of entities, and a ranking of the entities in the list of entities relative to each other entity in the list of entities based on a respective value of the context fact for the entity;

displaying in a first region on a display of the user device:
data describing a particular entity from the list of entities responsive to the query, and
data describing a second attribute associated with the particular entity responsive to the query; and displaying in a second region that is separate from the first region on the display of the user device:
data describing two or more other entities from the list of entities, and
data describing third attributes associated with the two or more other entities responsive to the query,
wherein the two or more other entities are arranged in relative order to each other based on a rank of the two or more other entities, the rank based on the context fact and respective values of the context fact for the two or more other entities.

8. The non-transitory computer storage medium of claim 7, wherein the context fact is selected by the search system based on a frequency of recent search queries.

9. The non-transitory computer storage medium of claim 7, wherein the context fact is selected by the search system based on one or more terms in the query.

* * * * *